United States Patent [19]
Kuckro et al.
[11] 3,819,410
[45] June 25, 1974

[54] HIGH VOLTAGE INSULATED CONDUCTOR

[75] Inventors: Gerard W. Kuckro; George E. Lorand, both of Cincinnati, Ohio
[73] Assignee: National Distillers and Chemical Corporation, New York, N.Y.

[22] Filed: May 23, 1972
[21] Appl. No.: 256,046

[52] U.S. Cl..... 117/232, 117/161 UZ, 117/161 UC, 117/161 UF, 174/110 PM
[51] Int. Cl. .......... B44d 1/42, H01b 3/44
[58] Field of Search........ 117/232, 161 UZ, 161 UC, 117/161 UF; 174/110 PM

[56] References Cited

UNITED STATES PATENTS

| | | | |
|---|---|---|---|
| 2,739,122 | 3/1956 | Kennerly et al. | 252/32.7 E |
| 2,739,123 | 3/1956 | Kennerly et al. | 252/32.7 E |
| 2,888,424 | 5/1959 | Precopio et al. | 260/889 X |
| 2,930,083 | 3/1960 | Vostovich et al. | 117/232 X |
| 3,036,034 | 5/1962 | Rumscheidt | 260/45.75 R |
| 3,375,303 | 3/1968 | Joyce | 117/232 X |
| 3,376,250 | 4/1968 | Newland et al. | 260/45.75 R |
| 3,535,257 | 10/1970 | Kutner | 174/110 PM |
| 3,666,715 | 5/1972 | Kutner | 174/110 PM |
| 3,684,821 | 8/1972 | Miyauchi et al. | 174/110 PM |

OTHER PUBLICATIONS

Insulation/Circuits, June/July 1971, pps. 109, 110, 122, 124.

*Primary Examiner*—William D. Martin
*Assistant Examiner*—Harry J. Gwinnell
*Attorney, Agent, or Firm*—Allen A. Meyer, Jr.

[57] ABSTRACT

A conductor having a high voltage insulation composition is disclosed wherein the insulating composition comprises unfilled, cross-linked low density ethylene homopolymers or ethylene-vinyl acetate copolymers having incorporated therein a synergistic anti-oxidant mixture of a hindered phenol and a zinc dialkyl dithiophosphate. The incorporation into the disclosed homopolymers or copolymers vastly improves the oxidative stability of the composition without staining, and provides a high voltage insulation composition having an unexpectedly reduced number of voids, thereby making the composition especially suitable for insulating high voltage conductors.

7 Claims, 4 Drawing Figures

HIGH VOLTAGE INSULATED CONDUCTOR

BACKGROUND OF THE INVENTION

Field of the Invention

1. The present invention relates to a high voltage insulated conductor, and more particularly, relates to a high voltage insulation composition having incorporated therein a synergistic antioxidant mixture, and a conductor having such an insulating coating.

Description of the Prior Art

2. The use of antioxidants in the polymer industry generally is of major importance because they extend the polymer's useful temperature range and service life. Generally, antioxidants for polymers are substances that oppose oxidation or inhibit reactions promoted by oxygen or peroxide, and generally retard atmospheric oxidation or the degradative effects of oxidation when added in small proportion to polymers. In finished polymer products, protection against oxidative deterioration is required to maintain the original properties of the polymer. In selecting a suitable antioxidant for a polymer system, various considerations are necessary such as the polymer structure, impurities in the polymer such as metal contaminants from raw materials or the catalyst used to produce the polymer, and the end use of the polymer.

Oxidation of polymers is normally caused by the formation of free radicals therein, and since hydroperoxides are normally the most important source for these free radicals it is desirable to decompose the hydroperoxide free radicals to non-radical products and thus destroy or inhibit the oxidation process. Many compounds have been found to inhibit oxidation by destroying organic peroxides or hydroperoxides, among which are the mercaptans, sulfides, phenols and dithiophosphates.

It has also been known in the past to employ two or more antioxidants simultaneously in a polymer, and when two or more antioxidants operate by the same mechanism or a different one to inhibit oxidation, a synergistic effect may result; that is, the combined effect of the two antioxidants will be greater than that of either one at a level equal to the sum of the concentration in the polymer. As an example, in the stabilization of polyolefins, in particular polypropylene, a synergistic antioxidant action occurs between phenols and sulfides, such as dilauryl-3, 3′-thiodipropionate and 2,6-di-tertiary butyl -4-methyl phenol, in which the sulfide acts as a peroxide decomposer and the phenol as a radical interceptor. The latter combination (a peroxide decomposer and a free radical inhibitor) is probably the most generally effective mixture of antioxidants in plastics.

As a further example of a synergistic combination U.S. Pat. No. 2,739,122, Kennerly et al discloses combinations of materials useful for the stabilization of organic substances against discoloration, polymerization, and oxidation. The combination comprises a tri-substituted mono-hydroxy phenol and a salt of a dialkyl dithio-phosphate, an example of the former being 2,6-di-tertiary butyl-4-methyl phenol, and an example of the latter being zinc di(4-methyl pentyl-2) dithiophosphate. Similarly U.S. Pat. No. 2,739,123, Kennerly et al, discloses an analogous combination wherein the phenol compound is a 2,2′-alkylidene-bis-4,6-disubstituted phenols.

The effect a certain combination of antioxidants is likely to have upon a given polymer is difficult to predict, since polymers vary in their ability to resist oxidation. Unsaturated polymers such as polystyrene, natural rubber, polybutadiene, etc. are most affected by oxidation whereas saturated hydrocarbons such as polyethylene, polypropylene, etc., are more resistant to oxidation than are unsaturated polymers, but even saturated polymers oxidize rapidly at elevated temperatures and in thin films during processing and later use. Once the oxidation reaction begins, it activates nearby spots in the molecules such that degradation is progressive. Especially when polymers are employed as electrical insulation are the effects of oxygen degradation important, since deterioration of the electrical properties of the insulator can result even before physical degradation becomes apparent.

As an example of the problems inherent in deterioration of electrical properties of polymers such as polyethylene which are normally employed as insulating compositions, the following is offered. During the initial stages in the oxidation of polyethylene, unstable hydroperoxide and peroxide groups (ROOH, ROO′) are formed, which on further oxidation are changed into the more stable carbonyl (C═O) groups. Due to their highly polar nature, the carbonyl groups, even at very low concentrations, exert a disproportionately large adverse effect on the electrical properties of the cross-linked polyethylene insulation. Particularly affected are the dissipation factor and the dielectric constant which increase fairly rapidly even in the early stages of oxidation. The presence of suitable antioxidants in the polyethylene insulation can suppress the formation of C═O groups, and thus lengthen considerably the useful electrical life of the insulation.

One important consideration in assessing the suitability of a polymeric insulation composition for high voltage application is the presence of voids in the polymer since they contribute to the degradation of electrical properties due to oxidation. Especially when a peroxide cross-linked polymer is employed as an insulating composition, it is very difficult to avoid formation of voids, since gases are normally evolved during cross-linking which become trapped in the polymer. As a result, the breakdown of a polymeric insulation due to high voltage corona discharge can be hastened by the presence of such voids. It has been shown that the gases ($H_2O$, $O_2$, hydrocarbons, etc.) entrapped in the voids of the insulating material are ionized by the high voltage of the corona. As a consequence, the ionized molecules become highly reactive and vigorously attack the surrounding polymeric (e.g., polyethylene) matrix. The sites of attack become in effect foci of oxidation degradation reactions in the polymer. These result in fairly rapid deterioration of electrical properties, especially the dissipation factor and the dielectric constant, and ultimately at a slower rate in the loss of physical properties.

Voids may be counted in accordance with the procedure described in Section G of AEIC (Association of Edison Illuminating Companies) Specification number 5-69, entitled "Specification for Polyethylene and Crosslinked Polyethylene Insulation, Shielded Power Cables Rated 2,001 to 35,000 Volts, Second Edition."

G 1.2(d) specifies the number of voids permitted in such insulation, as follows:

"The maximum number of voids between two and five mils allowed shall be 50 voids per cubic inch of insulation." Thus, it is apparent that with a number of voids greater than 50 per cubic inch of insulation, a deterioration of electrical properties results.

The presence of an antioxidant in a polymer may increase the suitability of that polymer for use in insulation environments. Specifically, polyethylene has long been known as an excellent insulation composition in view of its excellent physical and electrical characteristics, such as low moisture absorption, ease of processing and low volume cost. Especially low density, high molecular weight polyethylene, rather than high density polyethylene has been used as electrical insulation. However, polyethylene has certain limitations; for example, it is flammable, resulting in a maximum operating temperature of only 75° C., and it has a relatively high stiffness. By using crosslinked polyethylene, the maximum operating temperature can be increased to about 130° C. and the susceptibility to cracking under thermal and environmental stresses is reduced. When using, for example, a peroxide crosslinking agent, it is normally necessary to employ an antioxidant to reduce the tendency of the crosslinked material to oxidize. Accordingly, when employing crosslinked polyethylene one must judiciously select appropriate antioxidants to inhibit the tendency of the polyethylene to oxidize at higher temperatures in order to prevent the deterioration of its electrical properties.

As was briefly indicated above, many different types of antioxidants are known in the art. For example, U.S. Pat. No. 2,906,731, Hill et al, discloses that non-aromatic phosphorothioates are well known materials for preventing the degradation of butyl rubber and inhibiting the polymerization on heating. The terminology "butyl rubber" designates a copolymer of an iso olefin with a conjugated multi-olefin as is well known in the art. The phosphorothioate can be employed in the form of a zinc salt.

Similarly, U.S. Pat. No. 3.036,034, Rumscheidt, discloses a synergistic combination for stabilizing low-pressure high density polyolefins such as polyethylene. The patentee discloses a combination of a 2,6-di-tertiary-butyl-4-methoxy phenol in combination with an ester or ester salt of thiosulfuric acid of the formula $(RS_2O_3)_nX$.

Further, U.S. Pat. No. 3,376,250, Newland et al, discloses a combination of a sterically hindered phenol with a zinc N,N-di($C_1$–$C_{20}$ alkyl)dithiocarbamate, for use in a thermoplastic composition such as polyethylene or a copolymer of propylene and butene-1 containing a pigmenting amount of zinc oxide.

From the above discussion, it can be seen that hindered phenols are well known as antioxidants in materials such as polyolefins. However, U.S. Pat. No. 3,422,030, Riley, indicates that hindered phenols often have a tendency to discolor from their normally white, light or off-white color to yellow, on aging. Riley, however, indicates that this tendency can be inhibited or prevented by the addition of an organic phosphite to the composition. Riley further indicates that the primary antioxidant is a sterically hindered phenol and that a secondary antioxidant such as an organic thioester can be employed.

In addition to determining the suitability of antioxidants for a given polymer, with respect to the effects of inhibiting the oxidation thereof, a primary concern is the cost of the antioxidant selected. Generally, although hindered phenols are effective antioxidants for certain polymers, they are relatively expensive and therefore are undesirable if a significant amount thereof is required. Further, the solubility of the antioxidant in the polymer is significant since some antioxidants are not very soluble in certain polymers and therefore the optimum effect cannot be achieved since only an insufficient amount of the antioxidant can be dissolved in the polymer.

SUMMARY OF THE INVENTION

The present invention provides a high voltage insulation composition especially suited for use in high voltage applications comprising unfilled cross-linked low density ethylene homopolymers and ethylene-vinyl acetate copolymers having incorporated therein a synergistic antioxidant combination of a hindered phenol represented by the following formula:

Hindered Phenol

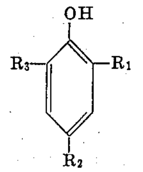

wherein $R_1$, $R_2$ and $R_3$ each represents the same or different straight or branched chain alkyl group or aralkyl group having from one to 30 carbon atoms; and a zinc dialkyl dithiophosphate represented by the following formula:

Zn dialkyl dithiophosphate

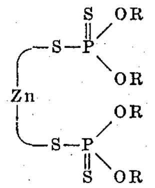

wherein R represents the same or different straight or branched chain aliphatic or cyclic alkyl group.

The synergistic antioxidant combination above-described confers an unusual combination of properties to the unfilled cured (i.e., cross-linked) composition of the present invention; specifically, the composition is white without any traces of yellowish stains, it has excellent electrical and physical properties, it has excellent heat and oxidative stability, it does not contribute to void formation (an essential property in high voltage insulation) and lastly, of economic importance, this combination of properties can be achieved at a significantly lower cost.

It is a primary object of the present invention to provide a high voltage insulation composition having virtually no voids.

It is another object of the present invention to provide a high voltage insulation composition having excellent electrical and physical properties.

It is yet another object of the present invention to provide a high voltage insulation composition having excellent heat and oxidative stability.

It is yet another object of the present invention to provide a high voltage insulation composition having an excellent combination of properties which can be achieved at a significantly low cost.

Other objects and advantages of the present invention will become apparent from the ensuing description.

DESCRIPTION OF THE PREFERRED EMBODIMENTS

Figure 1:
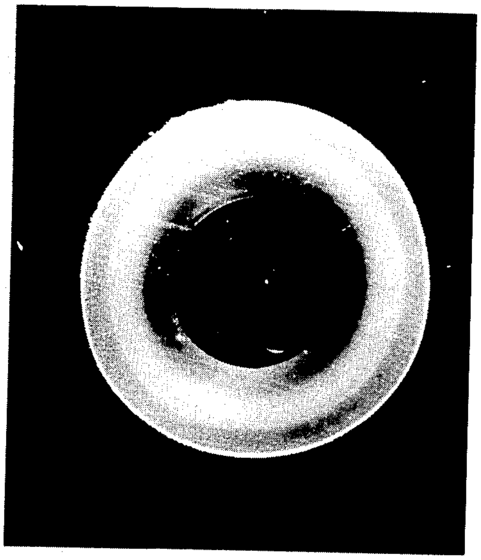
FIGS. 1–4 are photomicrographs of the conductor of the present invention (FIGS. 1 and 2) and a conductor of the prior art (FIGS. 3 and 4) using a known insulating composition.

The polymeric constituent of the composition of the present invention comprises unfilled low density polyethylene or an unfilled ethylene-vinyl acetate copolymer. Low density polyethylene as is known in the art, is an excellent insulator, and typically comprises polyethylene having a melt index (M.I.) of from 1 to 4 and a density of about 0.92 ± 0.0015. Such polyethylene can easily be produced, as is known, by a high pressure conventional prior art process, such as disclosed in Chemical Engineering News, 34,1470 (1956); M.W. Perrin, Research, 6,111 (1953); A. Renfrew, Plastics Institute Transactions, 19 (35), 5–19, (1951); F.A. Freeth, British Plastics, 18,444–47 (1946); and P.C. Allen, Plastics (London), 9,68–69, 72–73 (1945).

The unfilled ethylene-vinyl acetate copolymers include copolymers having from 0 to about 17 weight percent vinyl acetate. The lower limit of the vinyl acetate content is not important, but beyond about 17 percent vinyl acetate, the aging and electrical properties of the copolymer are adversely affected (although the other physical characteristics such as the mixing and extruding capabilities are somewhat improved). Such polymers are known in the art, and can be produced by any conventional method.

The use of the above-described unfilled low density polyethylene homopolymers and ethylene-vinyl acetate copolymers, in conjunction with the synergistic antioxidant combination of the present invention, results in a high voltage insulation composition having excellent and entirely unexpected properties, especially with respect to the greatly reduced tendency to form voids. There is no apparent relationship that exists between void formation and use of certain antioxidants, and thus, the fact that the insulating composition of the present invention results in substantially no voids is very surprising and very unexpected.

For use in the high voltage insulation composition of the present invention, it is important that the polymers be unfilled. The incorporation of fillers into the homopolymeric or copolymeric composition of the present invention impairs the inherently excellent electrical properties of the unfilled polymers, partly due to the presence of impurities contained in the fillers, and partly due to the accompanying decrease in hydrocarbon content which occurs as fillers are incorporated into the electrical insulation. Specifically, the dissipation factor and the dielectric constant would be increased so that the filled composition would no longer be useful in high voltage applications.

The vulcanizates of the present invention, whether derived from the polyethylene homopolymers or the ethylene-vinyl acetate copolymers, can be produced by curing (i.e., cross-linking) the unfilled polymer with a suitable curing agent. Although any cross-linking agent can be employed to cure the polymeric composition of the present invention, peroxides are preferred because they result in a very stable composition and are commercially available. The particular peroxide employed is not at all critical, with any conventional peroxide being operable, with one of ordinary skill in the art being able to select appropriate peroxides, depending on the polymer involved, end use requirements, etc.

A typical prior art peroxide curing process and typical peroxide curing agents are disclosed in, e.g., U.S. Pat. No. 2,888,424 Precopio et al. Any of the peroxide curing agents disclosed therein are operable in the present invention, as well as any other conventional peroxide curing agent. As an example, the following peroxides are operable in the present invention:

PEROXIDE CURING AGENTS

| Type | Compound | Trade Name | Source |
|---|---|---|---|
| Bifunctional Acyclic (R-OO-R'-OO-R) | 2,5-dimethyl-2,5-di-tert-butyl peroxy hexane | Lupersol 101 | Pennwalt Corporation |
| | 2,5-dimethyl-2,5-di-tert-butyl peroxy hexyne-3 | Lupersol 130 | Pennwalt Corporation |
| | 3,3-di-tert-butyl-peroxy butane carboxylic n-butyl ester | Trigonox 17 | Noury Chemical Corp. |
| Aralkyl | | | |
| 1) Monofunctional | dialpha cumyl peroxide | Di-Cup | Hercules Powder Co. |
| 2) Bifunctional | 1,3-bis(tert-butyl peroxy diisopropyl) benzene | Percadox 14 | Noury Chemical Corp. |
| | Mixture of 1,3 and 1,4-isomers of bis(tertbutyl peroxy diisopropyl)benzene | Vul-Cup | Hercules Powder Co. |
| 3) Trifunctional | 1,3,5-tris[$\alpha\alpha$-dimethyl-$\alpha$(tert-butyl peroxy) methyl] benzene | Lupersol D-241 | Pennwalt Corporation |

The manner of curing the polymers of the present invention is not critical, with one of ordinary skill in the art being able to select appropriate temperatures, times, pressures, amount of peroxide curing agent, etc. depending upon the desired end use and depending upon the characteristics of the particular polymer involved. As an example, the composition can be cured after extrusion onto a conductor by passing the coated conductor through a tube containing high temperature steam under pressure. Although the speed depends on the thickness of the coating, normally a residence time of from about 1 to 10 minutes in an atmosphere of saturated steam at a pressure of about 200 to 300 psi (i.e., temperatures ranging from about 390° to 425° F, depending on the pressure) is sufficient to cross-link the composition when a peroxide curing agent is employed. The peroxide is present in the composition in an amount sufficient to provide cross-linking, with an amount of from about 1.0 to 3.0 parts per 100 parts resin being preferred.

After passage through the steam-containing tube, the conductor with the cross-linked insulation is passed through a quench tank containing pressurized cooling water, as is standard in the cable industry.

The hindered phenol used as one of the antioxidants in the present composition has the following formula:

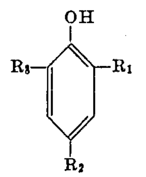

wherein $R_1$, $R_2$ and $R_3$ each represents the same or different alkyl or aralkyl group having from one to 30 carbon atoms, preferably three to 20 carbon atoms, wherein the alkyl group may be aliphatic (straight or branched - chain) or cyclic. Each of $R_1$, $R_2$ and $R_3$ may vary widely, it being preferred that $R_1$ and $R_3$ be the same alkyl group, especially tert-butyl. Hindered phenols, per se, are well known compounds, and can be prepared by known prior art methods; e.g., as taught in U.S. Pat. Nos. 2,802,884, 2,841,619, 2,942,033, 2,947,724, and 2,947,789; Malenik, Journal of the American Chemical Society, Volume 81, page 2,119 (1959); Stroh, Seydel and Han, Angew Chem., 69:699 (1957); etc.

Typical examples of suitable hindered phenols are as follows: 2,6-diocta-decyl-p-cresol (available commercially as "Eastman Inhibitor DOPC" from Eastman Chemical Products, Inc., especially preferred because of its liquid nature); 2,6-di-tertiary-butyl-4-methyl phenol; 2,4,6-tri(α-methyl benzyl) phenol; 2,4-di-methyl-6-tertiary-butyl phenol; 2,6-di-isopropyl-4-methyl phenol; 2,6-di-tertiary amyl-4-methyl phenol; 2,4,6-tri-tertiary amyl phenol; 2,6-di-tertiary amyl-4-tertiary butyl phenol; 2,4,6-tri-tertiary butyl phenol; 2,4,6-tri-isopropyl phenol; 2,6-di-dodecyl-p-cresol; 2,6-bis(1-methylheptadecyl)-p-cresol; 6-dodecyl-2-(1 methylheptadecyl)-p-cresol; 2-tertiary butyl-6-(1 methylcyclohexyl)-p-cresol; etc.

In addition to the above-identified hindered phenols, various methylenebis-phenols may be employed as the phenolic constituent of the synergistic antioxidant mixture of the present invention, such as 4,4′-methylenebis (2,6-dialkyl phenol) compounds; for example, where the "alkyl" moiety thereof is, e.g., tert-butyl, isopropyl, sec-butyl, 2-octyl, 2-hexyl, tert-amyl, 1,1,3,3-tetramethyl butyl, and mixtures thereof.

Other related alkylidene bisphenols (e.g., butylidene, etc.) may also be employed.

Further, complex hindered phenols having more than two phenol groups in the molecule can effectively be utilized; such as, for example, 1,3,5-trimethyl-2,4,6-tris (3,5-di-tert-butyl -4-hydroxy benzyl) benzene (available commercially as "Ionox 330" from the Ethyl Corp.); tetrakis [methylene-3-(3′,5′-di-tert butyl-4′-hydroxy phenyl) propionate] methane (available commercially as "Irganox 1010" from Geigy Chemical Co.); 3:1 (on a molar basis) condensate of 3-methyl-6-tert butyl phenol with crotonaldehyde (available commercially as "Topanol CA" from Imperial Chemical Industries, Ltd.); etc.

The present invention is not to be limited to the above hindered phenols, since any hindered phenol as defined above is operable in the present invention.

The zinc dialkyl dithiophosphate of the present invention is represented by the following formula:

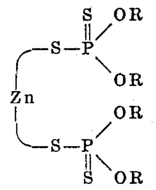

wherein R represents the same or different straight or branched chain aliphatic or cyclic alkyl group. Although all the "R" groups may be the same, these compounds usually are produced commercially with different alkyl substituents, by, for example, reacting a mixture of different primary and secondary alcohols with $P_2S_5$ and subsequently reacting the resulting mixture with zinc; or by first separately reacting each alcohol with $P_2S_5$, mixing the products and subsequently reacting the mixture with zinc.

Examples of commercially available zinc dialkyl dithiophosphates are "Hitec E-682" sold by Edwin Cooper Co. (formerly "Santolube 393" marketed by Monsanto), an all primary alcohol zinc dialkyl dithiophosphate, and "Lubrizol 1060" sold by the Lubrizol Corp., which is a zinc dialkyl dithiophosphate.

The zinc dialkyl dithiophosphates of the present invention can be produced by known prior art methods; e.g., as disclosed in U.S. Pat. Nos. 2,552,570, 2,595,170, 2,689,220, 2,838,555 and 3,000,822, etc.

For the purposes of the present invention, the number of carbon atoms in the alkyl group of the zinc dialkyl dithiophosphate, and whether R is the same or different alkyl group, is not important. Typical zinc dialkyl dithiophosphates are described in U.S. patents classified in Class 252, Subclass 32.7 of the Patent Office classification system. Therefore, the present invention is applicable to all such compounds, with straight or branched - chain, aliphatic, cyclic, or straight or branched - chain aliphatic substituted cyclic alkyl groups being operable. Generally, it is thought that alkyl groups having from one to 40 carbon atoms are especially suitable for forming zinc dialkyl dithiophosphates. However, it should be understood that the present invention is applicable to any zinc dialkyl dithiophosphate, with liquid zinc dialkyl dithiophosphates being preferred which are compatible with hindered phenols (i.e., mutually soluble) and soluble in the unfilled polyethylene homopolymers and unfilled ethylene-vinyl acetate copolymers of the present invention. In other words, long chain alkyl groups are preferred for R since these would tend to be more soluble than shorter chain groups.

The amount of antioxidant which is present in the composition of the present invention may vary from about 0.5 to about 1.0 part by weight of the total antioxidant content per 100 parts by weight of polymer. This range is somewhat critical, since with an amount substantially less than 0.5 part/100 parts polymer, an insufficient effect on oxidation results, whereas with an amount substantially greater than 1.0 part/100 parts polymer the electrical properties are adversely effected (probably due to the increased amount of polar substances therein) and an increased amount of crosslinking agent (e.g., peroxide) is required to compensate for the greater loss of peroxide due to antioxidant-peroxide interaction.

Employing this amount of antioxidant, the ratio by weight of the hindered phenol compound to the zinc dialkyl dithiophosphate may vary from about 1:5 to about 5:1. The particular ratio selected may vary depending upon the particular polymer involved, the particular antioxidant structure and the desired end use requirements. However, in the case of the ethylene-vinyl acetate copolymers, the preferred total combined level of antioxidant is about 1.0 part per 100 parts of polymer, with the preferred ratio of hindered phenol to the zinc dialkyl dithiophosphate being about 1:3 by weight. In the case of the ethylene homopolymer, the preferred total combined level of antioxidant is about 0.8 part per 100 parts of polymer, with the preferred ratio of hindered phenol to the zinc dialkyl dithiophosphate being about 1:3 by weight.

In formulating the composition of the present invention, the antioxidants and the peroxide curing agent may be added to the resin by any conventional procedure, such as on a two-roll mill or in an internal mixer such as a Banbury, such as is widely practiced in the rubber industry. During the mixing procedure, it is essential that the temperature be controlled to prevent premature crosslinking, which procedure is common in the preparation of crosslinkable compositions. Specifically, the temperature should be kept below 250° F when mixing the polyethylene and antioxidants (within a range of 220°–240° F being suitable) whereas the copolymer and antioxidants may be mixed within the range 200°–215° F.

It has been found that the antioxidant combination of the present invention significantly improves the heat resistance of the vulcanizates of the present invention whether derived from the homopolymers of ethylene or the ethylene-vinyl acetate copolymers of the present invention. Specifically, the following polyethylene vulcanizates were prepared (in parts by weight):

| Component | Sample No. | | | | | | | | |
|---|---|---|---|---|---|---|---|---|---|
| | 1 | 2 | 3 | 4 | 5 | 6 | 7 | 8 | 9 |
| Low Density Polyethylene (nominal melt index 2.0) | 100 | 100 | 100 | 100 | 100 | 100 | 100 | 100 | 100 |
| Dialpha Cumyl Peroxide | 2.75 | 2.75 | 2.75 | 2.75 | 2.75 | 2.75 | 2.75 | 2.75 | 2.75 |
| DOPC | 0.45 | | | | 0.9 | | | | |
| Santolube 393 | 0.45 | 0.45 | 0.45 | 0.9 | | | | 0.45 | |
| Topanol CA | | 0.45 | | | | | 0.9 | | |
| Ionox 330 | | | | | | | | 0.45 | 0.9 |
| Irganox 1010 | | | 0.45 | | | 0.9 | | | |

Each of the above formulations was subjected to a temperature of 150° C for 21 days, and the retention of tensile strength and elongation was measured for each, the results being shown below:

| Sample No. | % Retention Tensile Strength | % Retention Elongation |
|---|---|---|
| 1 | 96 | 95 |
| 2 | 87 | 91 |
| 3 | 88 | 97 |
| 4 | 39 | 21 |
| 5 (7 days — 150°C) | 23 | 10 |
| 6 | 17 | 4 |
| 7 (7 days — 150°C) | 27 | 11 |
| 8 | 91 | 97 |
| 9 | 30 | 3.1 |

From the above results, it can be seen that the combination of antioxidants of the present invention provides a significantly higher heat resistance as compared to the individual components of the combination.

To indicate the superiority of the high voltage insulation compositions of the present invention with respect to void formation, the following comparison was made. Low Density unfilled polyethylene formulations were prepared as follows:

FORMULATION 1

| | Parts (by weight) |
|---|---|
| Low Density Polyethylene (nominal melt index 2.0) | 100.00 |
| Dialpha cumyl peroxide | 2.25 |
| 2,6-dioctadecyl-p-cresol (DOPC) | 0.21 |
| zinc dialkyl dithiophosphate (Santolube 593) | 0.60 |
| | 103.06 |

FORMULATION 2

| | Parts (by weight) |
|---|---|
| Low Density polyethylene (nominal melt index 2.0) | 100.00 |
| Dialpha cumyl peroxide | 2.75 |
| Age Rite Resin D (polymerized trimethyl dihydroquinone sold by R. T. Vanderbilt Co., Inc.) | 0.5 |
| | 102.75 |

FORMULATION 3

| | |
|---|---|
| HFDB 4201 | Union Carbide's Unfilled polyethylene — non-staining — composition) |

Each formulation was formed into insulation by a continuous extrusion and vulcanization process known in the art, and the number of voids per cubic inch was measured for each sample. The process comprised extruding the polyethylene compositions as coatings onto a wire conductor, at a temperature of about 250° F (the temperature at which decomposition of the peroxide is still negligible). After extrusion, the coated wire was passed through a C.V. (continuous vulcanizer) metal tube 200 feet long which contained saturated steam at about 250 psi (equivalent to a temperature of about 400° F) for a residence time of 6–7 minutes, during which time cross-linking occurred. The coated wires then were passed to a quench tank containing pressurized cooling water.

The insulation based upon the first formulation employing the composition of the present invention exhibited substantially zero voids per cubic inch whereas the insulation based upon the commercial compound (formulation 3) exhibited a void content of 1,800 voids per cubic inch and the insulation based on formulation 2 exhibited a void content of 800 voids per cubic inch. Accordingly, it is apparent that the composition of the present invention results in a significantly superior electrical insulating composition as compared to the use of the disclosed prior art commercially known antioxidant (Age Rite Resin D) and the commercial composition HFDB 4201. The reduced number of voids achieved with the composition of the present invention was entirely unexpected, especially when compared to the number resulting from the use of Age Rite Resin D, one of the presently best-known commercial antioxidants.

Figure 2:
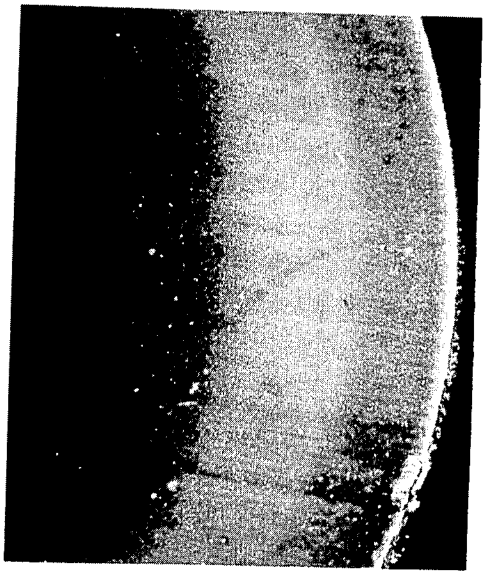
Figure 3:
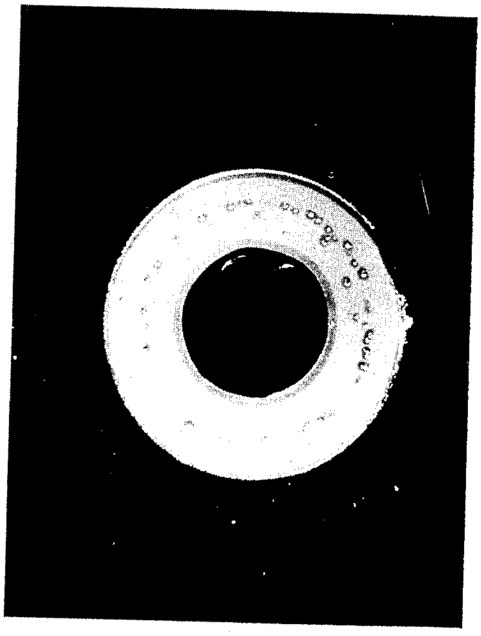
Figure 4:

Referring to the drawings, FIGS. 1 and 2 are photomicrographs of a conductor covered with formulation 1 above at magnifications of 4 and 15 times, respectively. FIGS. 3 and 4 show a conductor covered with formulation 3 at magnifications of 4 and 15 times, respectively. The difference in void formation is surprising as is clear from the attached photomicrographs.

The combination of antioxidants most preferred in the present invention is Hitec E-682 and Eastman Inhibitor DOPC, since both are liquids and mutually soluble and can thus be easily and uniformly dispersed in the polymer. In addition, the 18-carbon atom side chains in the DOPC help solubilize it in the polymer and finally, both compounds are quite nonvolatile.

The present invention will be further illustrated by reference to the following examples, which are intended to be merely illustrative and not limiting in nature. In the Examples, unless otherwise indicated, "parts" indicates "parts by weight."

EXAMPLES

The following vulcanizates were formed using the formulations indicated in the respective examples:

Example 1

| | Parts |
|---|---|
| Low density polyethylene (nominal melt index 2.0) | 100.00 |
| Dialpha cumyl peroxide | 2.25 |
| 2,6-dioctadecyl-p-cresol | 0.21 |
| Zinc dialkyl dithiophosphate (Hitec E-682) | 0.60 |
| | 103.06 |

Example 2

| | Parts |
|---|---|
| Ethylene-vinyl Acetate* | 100.00 |
| 1,3-bis(tert butyl peroxy diisopropyl)benzene | 1.41 |
| 2,6-dioctadecyl-p-cresol | 0.25 |
| Zinc dialkyl dithiophosphate (Hitec E-692) | 0.75 |
| | 102.41 |

*17% vinyl acetate, by weight

Example 3

| | Parts |
|---|---|
| Ethylene-vinyl acetate** | 100.00 |
| 2,6-dioctadecyl-p-cresol | 0.25 |
| Zinc dialkyl dithiophosphate (Hitec E-682) | 0.75 |
| Dialpha cumyl peroxide | 2.25 |
| | 103.25 |

**9% vinyl acetate, by weight

The physical properties of the formed vulcanizates from each of the above examples were measured by the ASTM method described in the following table and the results are shown in the following table:

TABLE

| Physical Properties<br>Original | ASTM Method | Example 1 | Example 2 | Example 3 |
|---|---|---|---|---|
| Tensile, psi | D-412 | 3090 | 3180 | 2920 |
| Elongation, % | D-412 | 617 | 513 | 540 |
| Aged | | | | |
| 14 days at 150°C. | | | | |
| Tensile, psi | D-412 | 3025(98) | 3185(100) | 2790(96) |
| Elongation, % | D-412 | 600(97) | 518(101) | 520(96) |

TABLE – Continued

| Physical Properties | | | | |
|---|---|---|---|---|
| Original | ASTM Method | Example 1 | Example 2 | Example 3 |
| 21 days at 150°C. | | | | |
| Tensile, psi | D-412 | 2900(94) | 3070(97) | 3030(104) |
| Elongation, % | D-412 | 615(100) | 523(102) | 540(100) |
| 28 days at 150°C. | | | | |
| Tensile, psi | D-412 | 3030(98) | 2760(87) | 2835(97) |
| Elongation, % | D-412 | 638(103) | 497(97) | 523(97) |
| Electrical Properties | | | | |
| Dielectric Constant | | | | |
| 60 Hz | D-150 | 2.22 | 2.72 | 2.60 |
| 1000 Hz | D-150 | 2.21 | 2.70 | 2.60 |
| Dissipation Factor | | | | |
| 60 Hz | D-150 | .00064 | .0025 | .0029 |
| 1000 Hz | D-150 | .00062 | .0047 | .0030 |
| Volume Resistivity ohm-cm. | D-257 | $3.76 \times 10^{16}$ | $5.0 \times 10^{15}$ | $3.85 \times 10^{16}$ |
| Dielectric Strength, v/mil. | D-149 | 1170 | 1270 | 1290 |
| ( ) indicates percent retention. | | | | |

The biggest advantage of the present invention is that a good insulation can be obtained for high voltage (normally higher than about 35–69 kilovolts) applications having substantially no voids using commercially available, inexpensive, antioxidants.

Although the invention has been described in detail with reference to the preferred embodiments thereof, it will be appreciated by those skilled in the art that modifications and changes may be made with respect thereto without departing from the spirit and scope thereof, as defined in the appended claims.

What is claimed is:

1. A high voltage conductor having an insulating coating thereon exhibiting substantially no voids comprising a high voltage insulating composition comprising an unfilled cross-linked polymer selected from the group consisting of low density ethylene homopolymers and ethylene-vinyl acetate copolymers having incorporated therein a synergistic antioxidant mixture consisting essentially of a hindered phenol represented by the following formula:

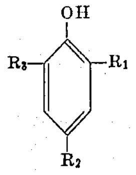

wherein $R_1$, $R_2$ and $R_3$ each represents the same or different aliphatic alkyl or aralkyl groups having from one to 24 atoms, and a zinc dialkyl dithiophosphate represented by the formula:

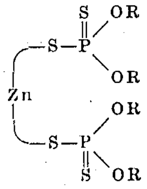

wherein R represents the same or different aliphatic or cycloaliphatic alkyl groups; wherein the total combined level of antioxidant in said composition varies from about 0.5 to 1.0 part by weight per 100 parts by weight of said unfilled cross-linked polymer; and wherein the weight ratio of the hindered phenol to the zinc dialkyl dithiophosphate varies from 1:5 to 5:1.

2. The high voltage conductor of claim 1 wherein the hindered phenol is 2,6-dioctadecyl-p-cresol.

3. The high voltage conductor of claim 1 wherein said unfilled polymer is a low density homopolymer of ethylene having a density of 0.920± 0.0015.

4. The high voltage conductor of claim 1 wherein the hindered phenol is an alkylidene bisphenol.

5. The high voltage conductor of claim 4 wherein the alkylidene bisphenol is a 4,4'-methylenebis (2,6-dialkyl phenol).

6. The high voltage conductor of claim 1 wherein the hindered phenol is a complex compound containing more than two hindered phenol groups selected from the group consisting of 1,3,5-trimethyl-2,4,6-tris(3,5-di-tert butyl-4-hydroxy benzyl) benzene, tetrakis (methylene-3-(3',5'-di-tert butyl-4'-hydroxy phenyl)-propionate)methane and a 3:1 molar condensate of 3-methyl-6-tert butyl phenol with crotonaldehyde.

7. The high voltage conductor of claim 1 wherein the alkyl moiety of the zinc dialkyl dithiophosphate has from one to 40 carbon atoms.

* * * * *